United States Patent [19]

Shimizu et al.

[11] Patent Number: 5,159,253
[45] Date of Patent: Oct. 27, 1992

[54] CONTROL DEVICE FOR A VIBRATION WAVE MOTOR

[75] Inventors: Masao Shimizu, Kawasaki; Nobuyuki Suzuki, Yokohama, both of Japan

[73] Assignee: Canon Kabushiki Kaisha, Tokyo, Japan

[21] Appl. No.: 718,926

[22] Filed: Jun. 25, 1991

Related U.S. Application Data

[63] Continuation of Ser. No. 630,784, Dec. 21, 1990, abandoned, which is a continuation of Ser. No. 545,133, Jun. 27, 1990, abandoned, which is a continuation of Ser. No. 430,976, Nov. 1, 1989, abandoned, which is a continuation of Ser. No. 338,528, Apr. 14, 1989, abandoned, which is a continuation of Ser. No. 159,306, Feb. 22, 1988, abandoned.

[30] Foreign Application Priority Data

Feb. 24, 1987 [JP] Japan .................. 62-041861
Feb. 24, 1987 [JP] Japan .................. 62-041862

[51] Int. Cl.$^5$ ........................... H01L 41/08
[52] U.S. Cl. ........................ 318/606; 318/114; 318/115; 318/118; 310/316; 310/323; 310/328
[58] Field of Search ............ 318/606, 114, 115, 118, 318/116, 560–640; 310/316, 323, 328

[56] References Cited

U.S. PATENT DOCUMENTS

| | | | |
|---|---|---|---|
| 4,484,099 | 11/1984 | Kawai et al. | 310/317 |
| 4,491,401 | 1/1985 | Inaba et al. | 354/271.1 |
| 4,495,432 | 1/1985 | Katsuma et al. | 310/328 |
| 4,504,760 | 3/1985 | Yamoto et al. | 310/323 |
| 4,513,291 | 4/1985 | Drabowitch | 343/771 |
| 4,560,263 | 12/1985 | Katsuma et al. | 310/317 X |
| 4,580,073 | 4/1986 | Okumura et al. | 310/323 |
| 4,587,452 | 5/1986 | Okumura et al. | 310/328 |
| 4,634,915 | 1/1987 | Mukoujima et al. | 310/323 |
| 4,645,964 | 2/1987 | Hiramatsu et al. | 310/323 |
| 4,649,311 | 3/1987 | Mukohjima et al. | 310/323 |
| 4,658,172 | 4/1987 | Izukawa . | |
| 4,660,933 | 4/1987 | Notagashira et al. | 31/323 X |
| 4,678,956 | 7/1987 | Izukawa et al. | 310/323 |
| 4,692,649 | 9/1987 | Izukawa et al. | 310/323 X |
| 4,692,650 | 9/1987 | Okumura et al. | 310/323 |
| 4,692,651 | 9/1987 | Hiramatsu et al. | 310/323 |
| 4,692,652 | 9/1987 | Seki et al. | 310/323 |
| 4,692,672 | 9/1987 | Okuno . | |
| 4,713,571 | 12/1987 | Suzuki et al. | 310/316 |
| 4,723,085 | 2/1988 | Mukohjima et al. | 310/328 |
| 4,727,276 | 2/1988 | Izukawa et al. | 310/316 |
| 4,734,610 | 3/1988 | Okumura et al. | 310/323 |
| 4,743,788 | 5/1988 | Takagi et al. | 310/323 X |
| 4,743,791 | 5/1988 | Kawai | 310/323 |
| 4,749,896 | 6/1988 | Suzuki et al. | 310/316 |
| 4,752,711 | 6/1988 | Tsukimoto et al. | 310/323 |
| 4,763,148 | 8/1988 | Tsukimoto et al. | 310/323 X |
| 4,763,201 | 8/1988 | Sakamoto | 358/282 |
| 4,788,468 | 11/1988 | Izukawa et al. | 310/323 |
| 4,794,294 | 12/1988 | Shimizu et al. | 310/316 |
| 4,810,923 | 3/1989 | Tsukimoto et al. | 310/323 |
| 4,833,358 | 5/1989 | Suzuki et al. . | |

FOREIGN PATENT DOCUMENTS 59-185178 10/1984 Japan .

Primary Examiner—Paul Ip
Attorney, Agent, or Firm—Fitzpatrick, Cella, Harper & Scinto

[57] ABSTRACT

The present invention relates to a vibration wave motor of the type in which an electro-mechanical energy conversion element is disposed on a vibration member and a frequency voltage is applied to the element to form a travelling vibration wave on the vibration member and a moving member is driven by the vibration wave. In the present invention, when the motor has assumed a resonance or the vicinity thereof when speed adjustment is being effected with the frequency of the periodic voltage changed, the change of the frequency to any frequency exceeding the then frequency is inhibited so that the drive frequency is not changed to a value exceeding the resonance frequency.

37 Claims, 4 Drawing Sheets

CONTROL DEVICE FOR A VIBRATION WAVE MOTOR

This application is a continuation of application Ser. No. 07/630,784 filed Dec. 21, 1990, now abandoned, which was a continuation of prior application Ser. No. 07/545,133 filed Jun. 27, 1990, now abandoned, which was a continuation of prior application Ser. No. 07/430,976 filed Nov. 1, 1989, now abandoned, which was a continuation of prior application Ser. No. 07/338,528, filed Apr. 14, 1989, now abandoned, which was a continuation of prior application Ser. No. 07/159,306 filed Feb. 22, 1988, now abandoned.

BACKGROUND OF THE INVENTION

1. Field of the Invention

This invention relates to a control device for a vibration wave motor in which a periodic voltage is applied to an electro-mechanical energy conversion element such as an electrostrictive element to form a travelling vibration wave in the surface of a vibration member and a moving member is driven by said vibration wave.

2. Related Background Art

In the vibration wave motor of the above-described type, it is known to adjust the frequency of said periodic voltage in adjusting the rotational speed of the motor.

That is, the motor of the above-described type has a characteristic that as the frequency of the periodic voltage applied to the electro-mechanical energy conversion element is made lower, the rotational speed of the motor becomes higher, and the frequency has been made variable for the speed adjustment to thereby accomplish speed control.

As described above, in the motor of the described type, as the drive frequency thereof is made lower, the speed thereof becomes higher, but such motor has a characteristic that the rotational speed is abruptly reduced when the frequency is reduced beyond the resonance frequency of the motor.

Accordingly, in controlling the speed of the motor, it is necessary to prevent said drive frequency from becoming lower than the resonance frequency of the motor, and as a method therefor, it is conceivable to store the resonance frequency of the motor and control the drive frequency so that the drive frequency does not become less than the stored frequency.

However, the resonance frequency in the motor of the described type is varied by environmental influences such as temperature, etc. and therefore, even if the resonance frequency is stored as a fixed value and said control is effected, the actual resonance frequency differs from the stored value and said inconvenience cannot be prevented.

Also, when the motor is to be set to a desired speed, a frequency corresponding to the desired speed may be selected and applied to said electro-mechanical energy conversion element, but if the frequency corresponding to said desired speed is directly selected at the starting of the motor, the motor abruptly starts to rotate and cannot be smoothly rotated.

To eliminate such problem, the drive frequency may be gradually reduced from a high frequency when the motor is started, and may be shifted to the frequency corresponding to the desired speed.

If the high frequency at the starting of the motor is set to a frequency at which the motor actually starts to rotate and the frequency is gradually reduced from this set frequency, the motor can be driven to the desired speed smoothly within a short time, whereas the characteristic of said motor is not constant but is affected by changes in the environmental conditions such as temperature, etc. and if the frequency at the starting of the motor is fixed, any change in temperature or the like cannot be coped with, and this leads to inconveniences such as said abrupt rotation and a long time required until the starting of the motor.

SUMMARY OF THE INVENTION

One aspect of the application is to provide a control device for a vibration wave motor in which inhibiting means is provided for detecting the vibration state during the driving of the motor, and when said vibration state has become resonance or the vicinity thereof when the drive frequency to the motor is being changed, inhibiting the change of the frequency exceeding it to thereby prevent the drive frequency from exceeding the resonance frequency.

One aspect of the application is to provide a control device for a vibration wave motor in which a maximum value during the change of a drive frequency during the driving of the motor or the vicinity of the maximum value is detected and the detected frequency is set as the initial value of the frequency at the next starting of the motor.

One aspect of the application is to provide a control device for a vibration wave motor in which at the starting of the motor, the frequency of the drive voltage thereof is gradually renewed from a particular value and also the start of the rotation of the motor during said renewal of the frequency is detected and the frequency at which the start of the rotation of the motor has been detected is set as the frequency at the next starting of the motor, whereby the next starting of the motor is renewed from said frequency.

Other objects of the present invention will become apparent from the following detailed description of an embodiment thereof taken in conjunction with the accompanying drawings.

DESCRIPTION OF THE PREFERRED EMBODIMENT

Figure 1:
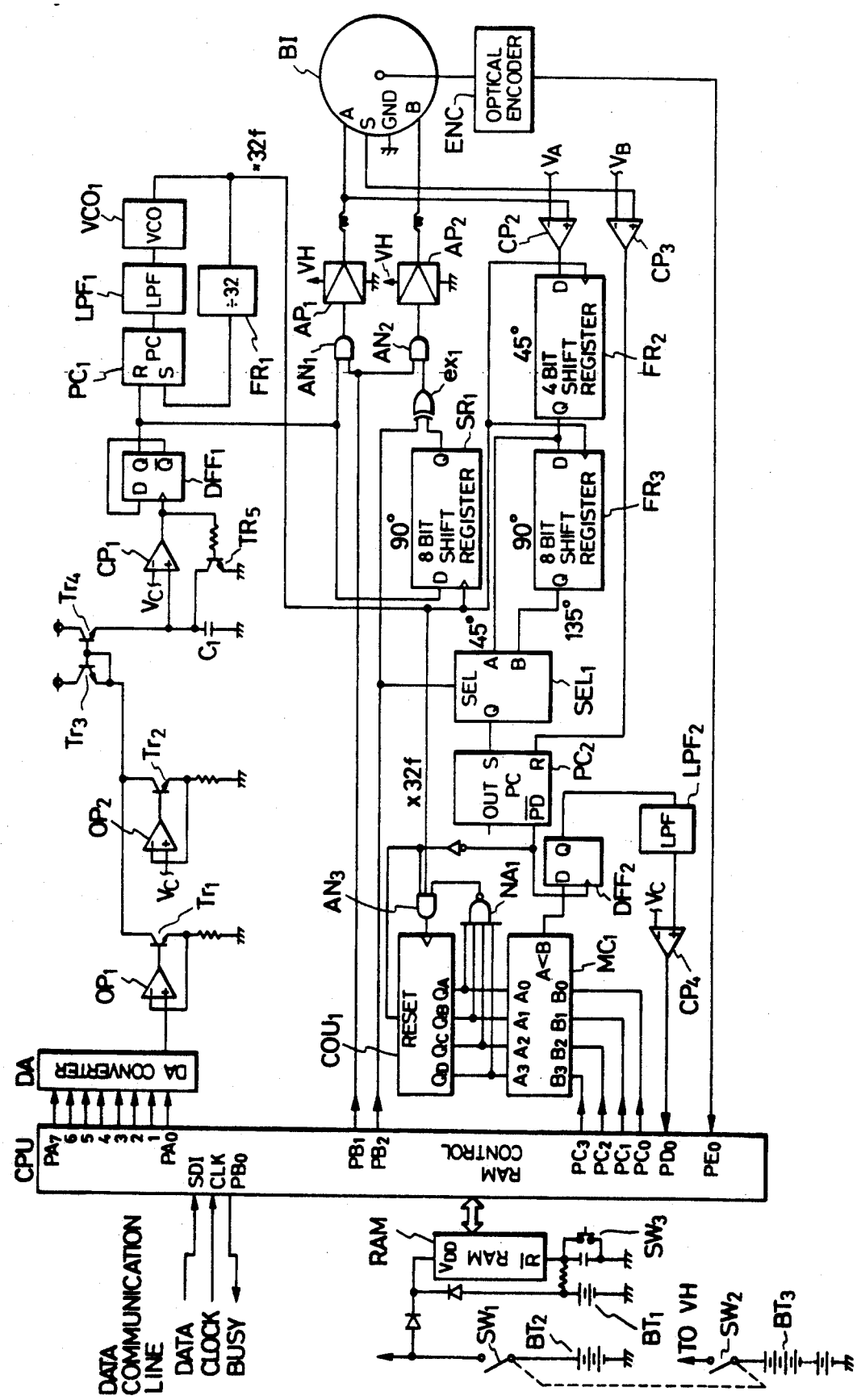
FIG. 1 is a circuit diagram showing an embodiment of a control circuit for a vibration wave motor according to the present invention.

FIG. 1 is a circuit diagram showing an embodiment of a control circuit for a vibration wave motor according to the present invention.

In FIG. 1, CPU designates a microcomputer.

In the microcomputer CPU, $PA_0$–$PA_7$ denote output ports from which information determining a drive frequency is output. A motor drive stop signal is delivered from an output port $PB_1$, and a direction signal determining the forward or reverse rotation of the motor is delivered from an output port $PB_2$. $PC_0$-$PC_3$ designate output ports which output resonance frequency information, $PD_0$ denotes an input port which inputs a lock signal, and $PE_0$ designates an input port which inputs a pulse from an encoder ENC.

DA denotes a DA (digital-analog) converting circuit connected to the output ports $PA_0$-$PA_7$ of the CPU for DA-converting the information output from these ports. $OP_1$, $OP_2$ and $Tr_1$, $Tr_2$ designate operational amplifiers and transistors, respectively, and $OP_1$ and $Tr_1$ together form a current corresponding to the output of the DA converting circuit, and causes a current mirror circuit comprising transistors $Tr_3$ and $Tr_4$ to form said current. Said $OP_2$ and $Tr_2$ together constitute an offset circuit by which an offset current is formed with a result that a current consisting of the current corresponding to the output of said DA converting circuit, plus said offset current, is formed in the transistor $Tr_4$ constituting the current mirror circuit.

$C_1$ designates a capacitor charged with the output current of the transistor $Tr_4$, $CP_1$ denotes a comparator, and $Tr_5$ designates a transistor. When the capacitor $C_1$ is charged to a predetermined voltage Vc, the comparator $CP_1$ renders its output into a high level (hereinafter referred to as 1) and turns on a transistor $Tr_5$. Accordingly, a pulse of a frequency corresponding to the value of the current of the transistor $Tr_4$ is output from the comparator $CP_1$. $DFF_1$ denotes a D flip-flop having its clock terminal connected to the output end of the comparator $CP_1$. The D flip-flop $DFF_1$ operates in synchronism with the pulse from the comparator $CP_1$, and converts the output pulse of the comparator $CP_1$ to a pulse of duty 50%.

$PC_1$ designates a phase comparator which, when the phases of input pulses to inputs R and S are coincident with each other, renders its output open and if the degree of coincidence between the phases of said input pulses is such that for example, the pulse of the S input end is delayed relative to the pulse to the R input end, renders the output into a high level (hereinafter referred to as 1) by an amount corresponding to the delay and if the pulse of the S input end is advanced relative to the pulse to the R input end, renders the output into a low level (hereinafter referred to as 0) by an amount corresponding to the advance. $LPF_1$ denotes a low-pass filter which increases its output level by the output of the phase comparator $PC_1$ becoming 1, decreases its output level by the output of the phase comparator $PC_1$ becoming 0, and maintains its output level when the phase comparator $PC_1$ is open. $VCO_1$ designates a voltage control oscillator whose output frequency is designed so as to become higher as the output of the low-pass filter $LPF_1$ becomes greater. $FR_1$ denotes a frequency dividing circuit for frequency-dividing the output of the voltage control oscillator $VCO_1$ into 32. The above-described construction ($PC_1$, $LPF_1$, $VCO_1$, $FR_1$) constitutes a phase locked loop which is controlled so that the S and R inputs of the comparator $PC_1$ become the same pulse with a result that the output of the voltage control oscillator $VCO_1$ outputs a pulse $32f_1$ which is 32 times the pulse frequency $f_1$ of the D flip-flop $DFF_1$.

$SR_1$ designates an 8-bit shift register having its D input connected to the Q output of the D flip-flop $DFF_1$ and having its clock input connected to the output of the voltage control oscillator $VCO_1$.

With such a construction, the shift register $SR_1$ makes its output Q into a pulse 90° out of phase with the pulse to the D input. $ex_1$ denotes an exclusive OR gate which receives as inputs the Q output of the register $SR_1$ and the direction signal DIR from the output port $PB_2$ of said CPU and which causes the Q output of the register $SR_1$ to be output intactly when the signal from the output port $PB_2$ is 0, and causes the Q output of the register $SR_1$ to be inverted and output when the signal from the output port $PB_2$ is 1. Thereby the output pulse of the gate $ex_1$ is made into a pulse ±90° out of phase with the flip-flop $DFF_1$, whereby the direction of rotation of the motor is changed over. $AN_1$ and $AN_2$ designate AND gates which transmit the output of the D flip-flop $DFF_1$ and the output of the gate $ex_1$ to amplifiers $AP_1$ and $AP_2$, respectively. BI denotes a vibration member on which electrostrictive elements are disposed. This vibration member is, for example, in the form of a ring, and electrostrictive elements are disposed on the surface thereof. A moving member of the same shape as the vibration member is in friction contact with the surface of the vibration member, and is driven by a travelling vibration wave generated in the vibration member.

Figure 2:
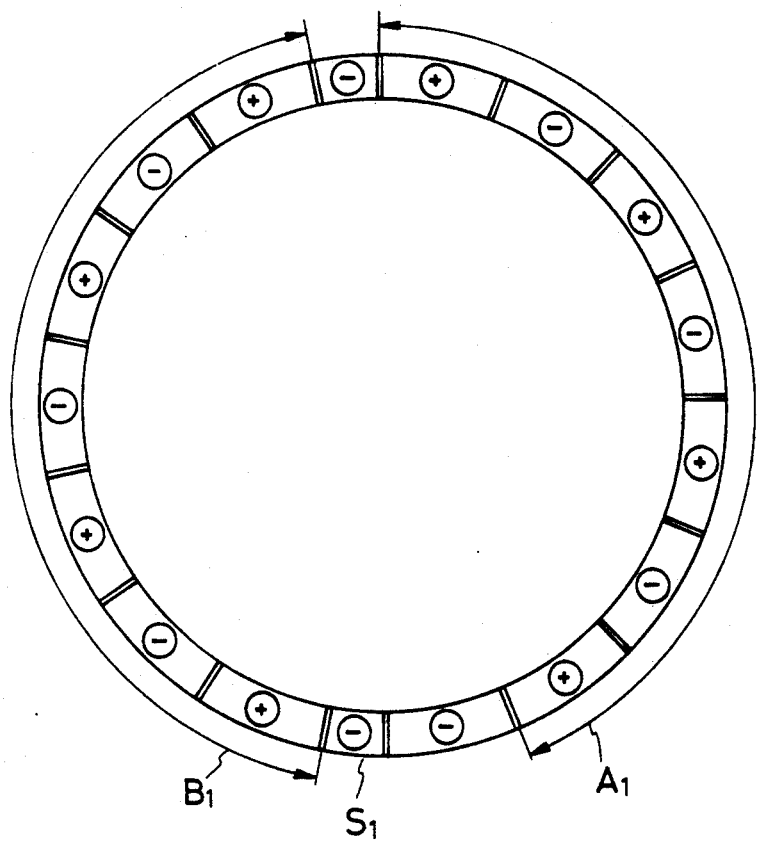
FIG. 2 shows the construction of electrostrictive elements disposed on the vibration member of a vibration wave motor used in the present invention.

FIG. 2 illustrates the state in which electrostrictive elements are disposed on the surface of the vibration member BI. In FIG. 2, $A_1$ and $B_1$ designate first and second electrostrictive element groups disposed on the vibration member BI in the shown phase and polarization relation. $S_1$ designates an electrostrictive element for a sensor disposed at a position 45° out of phase with the first electrostrictive element group $B_1$. These electrostrictive elements may be individually attached to the vibration member, or may be integrally formed by the polarization process. Turning back to FIG. 1, letters A, B and S designate drive electrodes and sensor electrode for the first and second electrostrictive element groups and the electrostrictive element $S_1$ for a sensor, respectively. A frequency voltage passed through said amplifier $AP_1$ is applied to the electrode A and a frequency voltage passed through said amplifier $AP_2$ is applied to the electrode B, whereby a travelling vibration wave formed in the surface of the vibration member BI. Also, when said vibration wave is formed in the vibration member, the electrostrictive element S for a sensor puts out an output (a frequency voltage) in conformity with the state of the vibration wave, and this is detected by the sensor electrode $S_1$. The vibration wave motor in its resonating state has a characteristic that the phase relation between the drive voltage to the electrode A and the output voltage from the sensor electrode exhibits a particular relation, and this characteristic is determined by the positional relation between the first electrostrictive element group $A_1$ to which a frequency signal is applied by the electrode A and the electrostrictive element S for a sensor, and in the case of the present embodiment, it is to be understood that in the forward rotation state, the resonating state is exhibited when the phases of the signal waveforms of the electrodes A and S are 135° out of phase with each other, that during the reverse rotation, the resonating state is exhibited when said phases are 45° out of phase with each other and that more deviation from resonance results in more deviation of said phase difference relation. $CP_2$ and $CP_3$ designate comparators for shaping the output waveforms of the electrodes A and S, respectively, into a pulse form.

$FR_2$ denotes a 4-bit shift register which receives the output of the comparator $CP_2$ as an input and connects the clock input to the output of the voltage control oscillator $VCO_1$. In this construction, the shift register FR$_2$ causes the output pulse of the comparator CP$_2$, i.e., the frequency signal of the electrode A, to shift by 45°. FR$_3$ designates an 8-bit shift register whose D input is connected to the Q output of the shift register FR$_2$ and which connects the clock input to the output of the voltage control oscillator VCO$_1$. The shift register FR$_3$ further shifts the output of the shift register FR$_2$ by 90°, and shifts the output of the comparator CP$_2$ as a whole by 135°. SEL1 denotes a data selector for selecting the output of the shift register FR$_2$ or FR$_3$. This selector selects the input B when the signal DIR of the output port PB$_2$ represents the forward rotation, and selects the input A when the signal DIR represents the reverse rotation.

Figure 3:
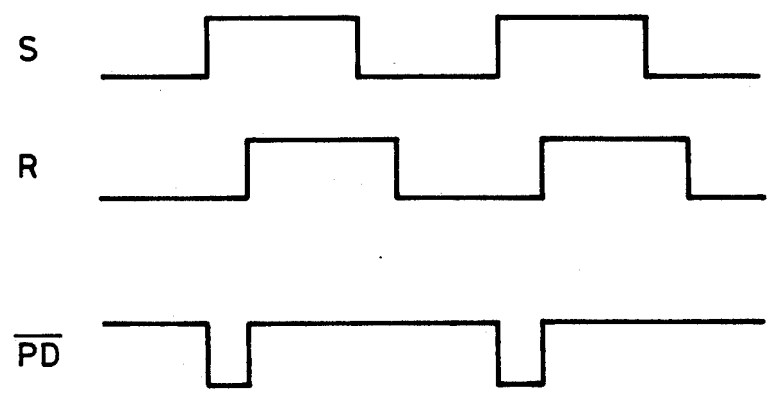
FIG. 3 is a waveform diagram for illustrating the operation of a comparator PC2 shown in FIG. 1.

PC$_2$ designates a phase comparator which, as shown in FIG. 3, detects the phase relation between the input pulses to the inputs S and R and outputs a signal of a smaller duty at which 1 is put out from an output $\overline{PD}$ as the phase difference is greater. I$_1$ denotes an inverter, COU$_1$ designates a counter, and AN$_3$ denotes an AND gate. The counter COU$_1$ is reset when the signal to a reset input $\overline{RESET}$ is 0. Also, the AND gate AN$_3$ transmits the pulse from the voltage control oscillator VCO$_1$ to the counter COU$_1$ when the output of the inverter I$_1$ is 1. By the above-described construction, the counter COU$_1$ counts the pulses from the voltage control oscillator VCO$_1$ during the period during which the output of the comparator PC$_2$ is 0, and the count value of the counter COU$_1$ decreases as the motor approaches a resonating state. MC$_1$ designates a magnitude comparator which compares the value of inputs (A$_0$–A$_3$) with the value of inputs (B$_0$–B$_3$) and outputs 1 when A<B. The output of the comparator MC$_1$ is connected to the D input of D type flip-flop DFF$_2$. The clock input of the flip-flop DFF$_2$ is connected to the output $\overline{PD}$ of the comparator PC$_2$, and detects the state of the D input in synchronism with the rising of the pulse to the clock input.

LPF$_2$ denotes a low-pass filter, and CP$_4$ designates a comparator which is responsive to the Q output 1 of the flip-flop DFF$_2$ to transmit the 1 signal to the input port PD$_\phi$ of the CPU.

ENC denotes a code plate such as a pulse plate rotatable in response to the moving member of the motor. The code plate ENC forms a pulse of a frequency conforming to the rotational speed of the motor.

RAM designates a random access memory which effects data communication with the CPU. The RAM is normally supplied with electric power from a back-up power source BT$_1$ and is also supplied with electric power from a power source BT$_2$ through a main switch SW$_1$. Also, power supply to various circuit portions except amplifiers AP$_1$ and AP$_2$ is effected by the power source BT$_2$. SW$_2$ denotes a switch adapted to be closed in response to the switch SW$_1$. The output of a high voltage source BT$_3$ is supplied to the amplifiers AP$_1$ and AP$_2$ through the switch SW$_2$. SW$_3$ designates a reset switch for resetting the content of the memory RAM.

Figure 4A:
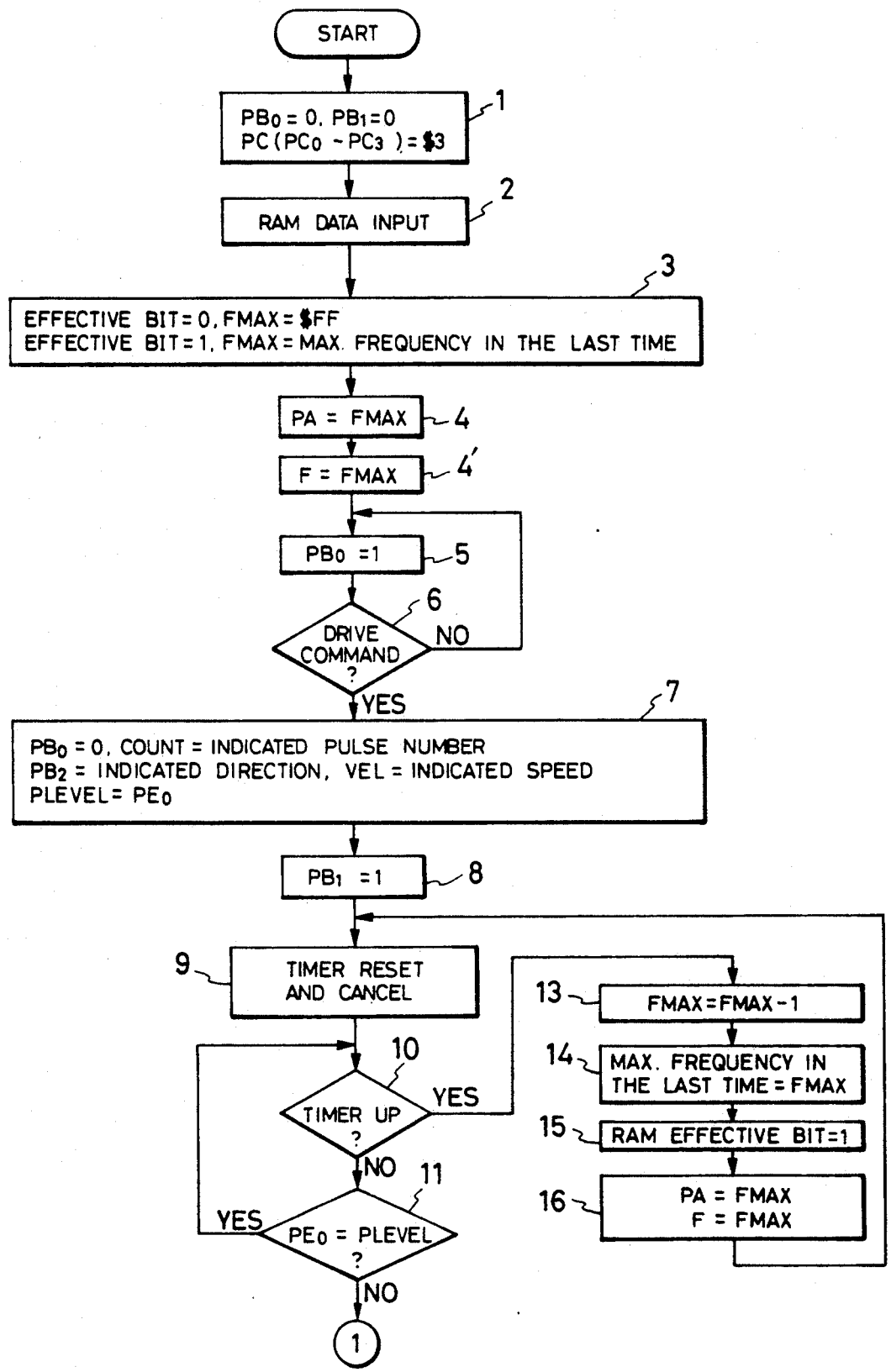
FIGS. 4A and 4B illustrate the program flow contained in the computer CPU of FIG. 1.
Figure 4B:
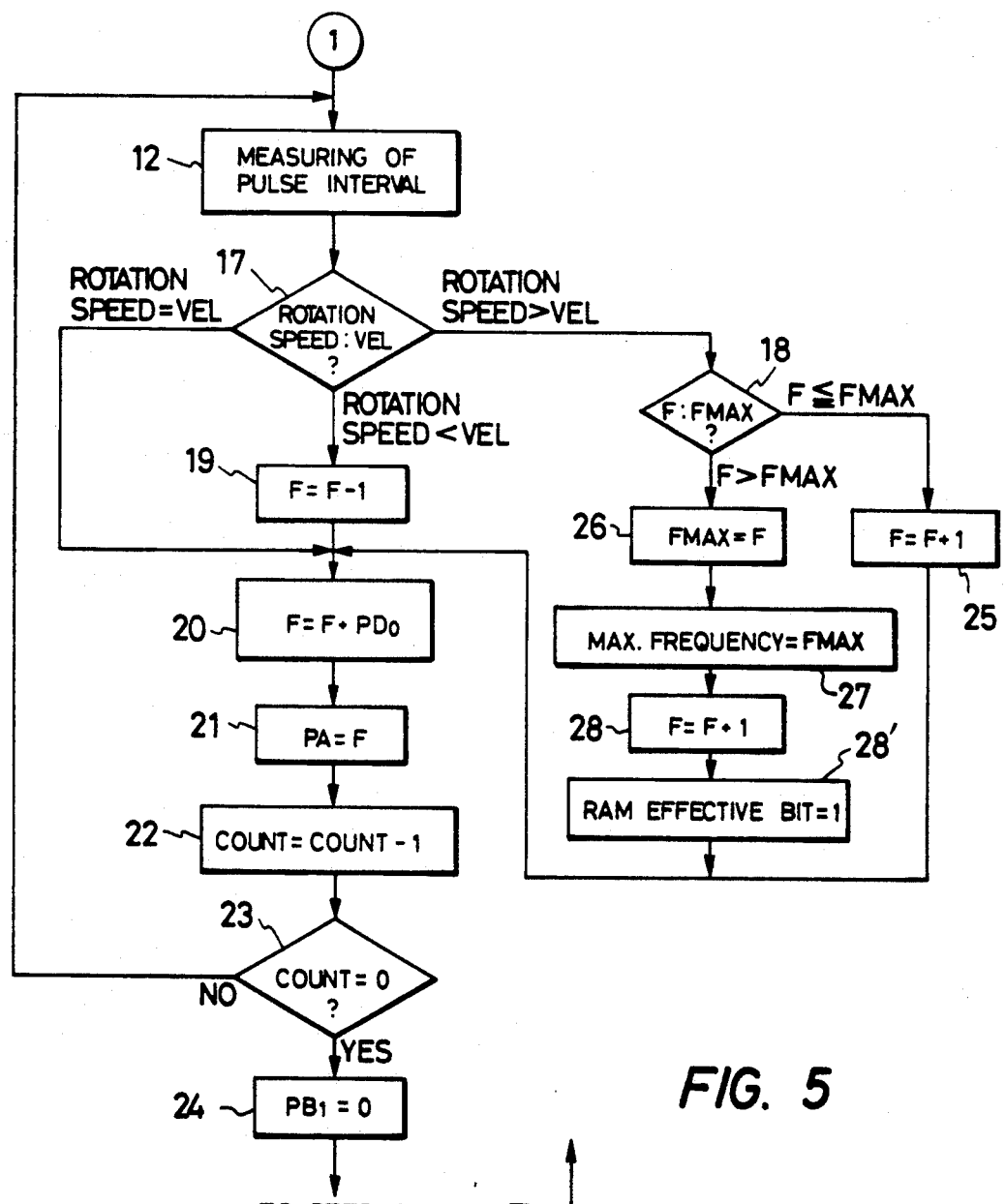

FIG. 4 is a program diagram showing the program flow programmed in the ROM contained in the computer CPU of FIG. 1. The computer CPU executes its control operation in accordance with this program flow.

The operation of the FIG. 1 embodiment will now be described.

When the main switch SW$_1$ is closed, the output of the power source BT$_2$ is applied to each circuit. Thereupon, the computer CPU starts to operate.

When the computer CPU starts to operate, step 1 is first executed. The operation of each step will hereinafter be described.

Step 1: 0 is output from the output port PB$_0$ and 0 is output from the output port PB$_1$. A predetermined set value $3 is output from the output ports PC$_0$–PC$_3$.

Step 2: The effective bit data of the RAM is input.

Step 3: When said data is 0, a variable FMAX=$FF, and when said data is 1, the maximum frequency in the last time stored in the RAM is read out, and FMAX=-maximum frequency in the last time.

During the first driving of the motor, said effective bit data is 0 and the variable FMAX is set to FMAX=$FF.

Step 4: Said variable FMAX is output from the output ports PA$_0$–PA$_7$. The FMAX information from these ports is converted to an analog voltage by the DA converter DA, and by the actions of the amplifiers OP$_1$, OP$_2$ and transistors Tr$_1$–Tr$_4$, a current value corresponding to said variable FMAX flows to the transistor Tr$_4$.

Step 4': The internal memory F is caused to store said variable FMAX therein.

Step 5: 1 is output from the output port PB$_0$. The 0 from this port PB$_0$ is acting as a so-called busy signal, whereby busy is released, and the communication with the computer CPU is permitted for a circuit, not shown, connected to the computer CPU.

Step 6: The data input from a circuit, not shown, to the input port SDI of the computer is detected, and whether a drive command signal is input as data from a circuit, not shown, is judged, and steps 5 and 6 are repeated until the drive command signal is input, and when the drive command signal is input, the program proceeds to step 7. It is to be understood that said drive command signal is formed by a manually operated start switch provided in a circuit, not shown, becoming closed, and is input to the input port SDI, and by the start switch being operated, the program shifts to step 7.

When said step 5 is executed, the communication with a circuit, not shown, is permitted as described above, and in the meantime, data such as the information of the rotational speed of the motor, the information of the amount of rotation of the motor and the information of the direction of rotation of the motor set by a circuit, not shown, are input to the input port SDI of the computer.

Step 7: The output port PB$_0$ is rendered into 0, the communication between a circuit, not shown, and the computer CPU is inhibited, the memory COUNT is caused to store therein said set information of the amount of rotation as an indicated pulse number, and VEL is caused to store therein said set information of the rotational speed as an indicated speed. Also, on the basis of the set information of the direction of rotation, 1 or 0 is output from the output port PB$_2$.

Also, the information 1 or 0 from the input port PE$_0$ is input to a memory PLEVEL. The input port PE$_0$ is connected to the encoder ENC, which is comprised of a code plate (a pulse plate) or the like and forms the repetition of 1 or 0 signal by the rotation of the motor. Consequently, the output of the encoder ENC before the motor starts to rotate puts out 0 or 1 in conformity with the initial position of the code plate, and this initial state of the code plate is stored in the memory PLEVEL.

Step 8: 1 is output from the output port PB$_1$. Thus, the AND gates AN$_1$ and AN$_2$ become open and the output of the flip-flop $DFF_1$ and the output of the exclusive OR gate $ex_1$ are transmitted to the amplifiers $AP_1$ and $AP_2$.

As described above, a current corresponding to the variable FMAX=$FF is flowing to the transistor $Tr_4$, and as described above, the flip-flop $DFF_1$ outputs a pulse of a frequency corresponding to said current value, and as described above, a pulse 90° out of phase with the output pulse of the flip-flop $DFF_1$ is output from the exclusive OR gate $ex_1$ and therefore, frequency voltages of frequency $FF 90° out of phase with each other are applied to the electrodes A and B and the motor starts to rotate.

Step 9: The internal timer is reset, whereafter the resetting is cancelled. Thus, the time count by the timer is started.

Step 10: Whether the timer has counted a predetermined time is detected, and if the counted time by the timer has not elapsed, the program shifts to step 11, and if the counted time by the timer has elapsed, the program shifts to step 13.

Step 11: Whether the input signal from the input port $PE_0$ and the signal of the memory PLEVEL are identical to each other is detected, and if they are identical, the program again shifts to step 10, and if they are not identical, the program shifts to step 12.

The signal of the encoder ENC before the motor is started is stored in the memory PLEVEL, and when the motor rotates from that state, the output signal of the encoder ENC changes and therefore, it becomes incoincident with the signal stored in the memory PLEVEL. Consequently, at this step, the change in the signal of the encoder ENC is detected, and whether the motor has actually started to rotate is detected, and when the motor has rotated, the program shifts to step 12.

Assuming that the motor does not start to rotate within the time counted by the timer, the steps 10 and 11 are repeated and the program shifts to step 13 when the timer is up.

Step 13: −1 is effected for the variable FMAX and FMAX-1 is used as a new variable FMAX.

Step 14: Said new variable is input as the maximum frequency in the last time to RAM.

Step 15: The effective bit data of RAM is set to 1.

Step 16: The new variable FMAX obtained at step 13 is output from the output ports $PA_0$-$PA_7$, and the drive frequency to the electrodes A and B is renewed in the manner described above and said FMAX is input to memory F, and the program shifts to step 9 again. By the processing of steps 13-16 being effected, FMAX becomes −1 and the set frequency is decreased (reduced). Consequently, if the motor actually does not start to rotate in spite of its driving being started at step 8, the set frequency is decreased (reduced) by a predetermined amount for each predetermined time. Thereby, the drive frequency to the motor is gradually reduced and the scanning of the drive frequency to the motor is effected.

Also, when the motor rotates in the process in which the scanning of the drive frequency is being effected in the manner described above, the program shifts to step 12 in the manner described above. Thus, the frequency at which the motor has actually started to rotate is stored in the RAM.

In the manner described above, the frequency of the frequency voltage to the electrodes A and B is renewed (decreased) and, when the motor starts to rotate, step 12 is executed.

Step 12: The pulse interval time from the encoder input to the input port $PE_0$ is measured to find the rotational speed of the motor. This pulse interval measurement is the measurement of two pulse interval times continuously input from the encoder ENC.

Step 17: The detected rotational speed found at step 12 and the indicated rotational speed stored in the memory VEL are detected, and when the detected rotational speed < the indicated rotational speed, the program shifts to step 19, and when the detected rotational speed > the indicated rotational speed, the program shifts to step 18, and when the detected rotational speed = the indicated rotational speed, the program shifts to step 20.

The motor rotates at a higher speed as the drive frequency is lower, and as described above, the drive frequency of the motor is gradually reduced from $FF and the motor is shifted to its rotating state and therefore, when the motor starts to rotate, there is usually the relation that the detected rotational speed < VEL, and the program shifts to step 19.

Step 19: −1 is effected for the content of the memory F, i.e., FMAX when the motor starts to rotate, and FMAX-1 is input to the memory F.

Step 20: The value of the input port $PD_0$ is added to the content of the memory F. Since 0 is usually input to the input port $PD_0$, the content of the memory F is usually not varied by this operation.

Step 21: The content of the memory F is output from the output ports $PA_0$-$PA_7$. Thus, the drive frequency to the motor decreases by a predetermined value from the frequency FMAX when the motor starts to rotate, and the motor increases its rotational speed.

Step 22: −1 is effected for the pulse number representative of the number of rotations of the motor set in the memory COUNT.

That is, the measurement of the pulse interval time at the step 12 is effected each time one pulse is input from the encoder ENC and therefore, by said step being executed, the motor is driven by an amount corresponding to one pulse, and said −1 is effected to find the remaining amount of rotation of the motor, which in turn is input to the memory COUNT.

Step 23: Whether the memory COUNT=0 is detected, and when COUNT≠0, the program shifts to step 12 again, and when COUNT=0, the program shifts to step 24.

That is, when the remaining amount of rotation of the motor is not zero by the rotation of the motor, the program Q shifts to step 12 again, and the above-described operation is repeated.

Each time the operations of the above-described steps 12, 17 and 19-23 are repeated, the drive frequency of the motor is gradually reduced and the rotational speed of the motor gradually increases.

When by the repetition of said steps, the rotational speed of the motor has reached the indicated speed, it is detected at step 17, and the program shifts to step 20 without the intermediary of said step 19. Consequently, by the number of rotations of the motor reaching the indicated number of rotations, −1 for the content of the memory F is discontinued, and the motor is driven at the drive frequency at that point of time and its rotational speed becomes the indicated speed.

Description will now be made of a case where the speed of the motor exceeds the indicated drive for some reason or other when the motor is thus rotating at the indicated speed.

In such case, it is detected at step 17 that the rotational speed > VEL and therefore, the program shifts to step 18.

Step 18: The content of the memory F is compared with FMAX stored in the RAM, and when F≦FMAX, the program shifts to step 25, and when F>MAX, the program shifts to step 26.

Let it be assumed that at said step, the content of the memory F is smaller than the content when the motor is driven, i.e., FMAX stored in the RAM. In such case, the program shifts to step 25.

Step 25: +1 is effected for the content of the memory F, F+1 is input to the memory F, and the program shifts to step 20, whereafter as long as the rotational speed > VEL and F≦FMAX, the steps 12→17→18→25→20→21→22→23 are repeated.

Accordingly, when the rotational speed becomes higher than the indicated speed, the drive frequency gradually increases and the rotational speed is reduced.

At each step described above, the rotational speed of the motor is usually servo-controlled to the indicated speed, and description will now be made of a case where the rotational speed cannot be reduced to the indicated speed even if during said decelerating operation, the content of the memory F is made greater than FMAX for some reason or other.

When such a state (F>FMAX) is detected at step 18, the program shifts to step 26.

Step 26: The content of the memory F is rendered equal to the variable FMAX. Thereby, FMAX of a higher frequency is formed relative to the FMAX stored in the RAM when the motor has started to rotate.

Step 27: The FMAX formed at said step 26 is set as a new maximum frequency in the last time in the RAM.

Step 28: +1 is effected for the content of the memory F, and F+1 is input to the memory F.

Step 28': The effective bit data of the RAM is rendered into 1, and the program shifts to step 20, whereafter as long as the rotational speed > VEL and F>FMAX, the steps 12→17→18→26→27→28→28'→20→21→22→23 are repeated.

Even if F>FMAX is brought about by the above-described operation, when the rotational speed of the motor is higher than the indicated speed, the content of the memory F is increased by +1 each and the drive frequency is gradually increased and also the maximum frequency in the last time in the RAM is likewise renewed (increased), whereby control is effected so that the rotational speed of the motor gradually decreases to the indicated speed.

The motor is controlled so as to assume the indicated speed until the above-described steps 12, 17–23 and 25–28 and also, when the motor drive frequency at that time exhibits a frequency higher than the frequency FMAX set in the RAM when the motor has been started, that frequency is stored in the RAM and the actual maximum frequency when the motor is driven is stored in the RAM.

Also, when the drive frequency has become the resonance frequency of the motor or the vicinity thereof in the process in which during the speed control of the motor, accelerated drive is effected and the drive frequency is gradually decreased, design is made such that said frequency is not reduced below it.

That is, as previously described, the counter 1 of FIG. 1 is designed to count the pulses from the voltage control oscillator $VCO_1$ for the period during which 0 is output from the output $\overline{PD}$ of the comparator $PC_2$. Also, the comparator $PC_2$ is adapted to output 0 from its output $\overline{PD}$ for a short time in conformity with the phase difference between the pulses of the inputs R and S to such an extent that the phase difference becomes zero, and is designed such that the phase difference between the pulses to the inputs R and S to the comparator $PC_2$ becomes more approximate to zero as the motor becomes more approximate to the resonating state. Accordingly, the count value by the counter $COU_1$ is decreased as the motor becomes more approximate to the resonating state, and said count value becomes less than a predetermined value $3 when the motor has reached the resonating state or the vicinity thereof. This state is detected by the comparator $MC_1$, and when the motor has reached the resonance or the vicinity of the resonance, the output of the comparator $MC_1$ becomes 1, and this is detected by the flip-flop $DFF_2$ and the output Q of the flip-flop $DFF_2$ becomes 1. In response to this Q output 1 of the flip-flop $DFF_2$, the comparator $CP_4$ also outputs 1, which is input to the input port $PD_0$ of the computer CPU.

Figure 5:
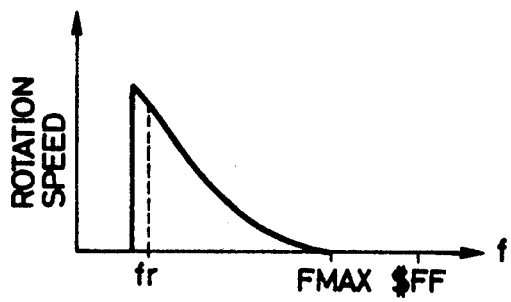
FIG. 5 illustrates the operation of controlling the rotation of the vibration wave motor of the present invention.

Accordingly, when the motor has assumed the resonating state or the vicinity thereof, 1 is transmitted to the input port $PD_0$, and in the acceleration control process of the motor, $F=F+PD_0=F=F+1$ is done at step 20. Accordingly, by the acceleration control, $F=F-1$ is effected at step 19, and when the motor has assumed the resonating state or a frequency in the vicinity thereof after the frequency has been decreased, +1 is effected for F at step 20 with a result that $F=F-1+1=F$, and the decrease in the frequency by said step 19 is cancelled at step 20, and when that frequency has become the resonance frequency or the vicinity thereof, even if the rotational speed of the motor has not reached the indicated speed, the frequency is prevented from becoming lower and after all, the drive frequency of the motor is not reduced below the resonance frequency or the vicinity thereof. The reason why the frequency of the motor is limited when the frequency is thus decreased is that as shown in FIG. 5, the motor is abruptly reduced in its rotational speed if the frequency is reduced below the resonance frequency past the resonance frequency fr, and such a phenomenon is prevented from occurring by the above-described frequency limitation.

When the motor is driven by the indicated amount of rotation in the process in which the speed control of the motor is effected as described above, the content of the memory COUNT becomes 0. Consequently, in this case, the program shifts to step 24.

Step 24: 0 is output from the output port $PB_j$. Thereby the gates $AN_1$ and $AN_2$ are closed and the application of the frequency voltage to the electrodes A and B is inhibited and thus, the motor is stopped and the first motor drive is terminated. Thereafter, the program shifts to the step 2.

Now, when during the first motor drive, steps 13–16 or steps 27–28' are executed and the maximum frequency of the RAM is changing from $FF, the effective bit of the RAM is set to 1.

Accordingly, the maximum frequency at which the motor has actually been driven during the first motor drive is read out from the RAM at the next motor drive steps 2 and 3, and this maximum frequency in the last time is output from the output ports $PA_0$–$PA_7$ and also is input to the memory F, and a preparation for setting is made so that during the next motor drive, the drive frequency when the motor is started is the maximum frequency at which the motor could actually be dirven in the last time.

Accordingly, at a point of time whereat during the next motor drive, the start switch is closed by a circuit, not shown, and the motor control by the execution of each step subsequent to said step 7 is effected, the drive frequency therefor starts from said maximum frequency in the last time.

Also, usually, when the maximum frequency at which the motor could actually be driven immediately before is the drive frequency of the motor in the next time, the motor can be rotated at that frequency, whereby the motor immediately starts to rotate without the necessity of scanning the drive frequency from $FF.

Also, even if the main switch $SW_1$ is opened after the first motor drive, the content of the RAM is held and thus, even when the main switch $SW_1$ is again closed and the program is executed from step 1, the drive is likewise started from the maximum frequency in the last time.

In the embodiment illustrated, when the drive speed of the motor is to be fixed at the resonance speed, $-1$ is effected at step 19 and $+1$ is effected at step 20, but alternatively, the frequency changing operation itself thereafter may be inhibited. Also, in the embodiment, electrostrictive elements are used as electro-mechanical and mechanico-electrical energy conversion elements, but alternatively, piezoelectric elements may be used.

Also, in the embodiment, the frequency at the start of the rotation of the motor is stored and it is set as the initial value at the next start, but alternatively, a frequency within a predetermined range about the frequency at the start of the rotation of the motor may be stored or may be found by a calculation and it may be set as the next initial value.

We claim:

1. A control device for a vibration wave motor in which a periodic voltage is applied to an electro-mechanical energy conversion element disposed on a vibration member to form a travelling vibration wave in the vibration member and a contact member is driven by said travelling vibration wave, said control device, comprising:
   (a) a determining circuit for monitoring a driving state of said motor and determining a resonance frequency or a frequency in the vicinity thereof;
   (b) a changing circuit for changing a frequency of the periodic voltage from a predetermined value toward the resonance frequency, said changing circuit changing the frequency independently from the resonance frequency or the frequency in the vicinity thereof determined by said determining circuit; and
   (c) inhibiting means for inhibiting the frequency changed by said changing circuit from shifting to a frequency exceeding the resonance frequency or the frequency in the vicinity thereof, said frequency in the vicinity thereof being a frequency shifted from the resonance frequency toward the predetermined value.

2. A control device according to claim 1, wherein said changing circuit time-serially changes the frequency of said frequency voltage from a frequency higher than said resonance frequency to a frequency lower than said resonance frequency.

3. A control device according to claim 2, wherein said changing circuit has renewing means for time-serially renewing the determined frequency value by a predetermined value each toward the lower frequency.

4. A control device according to claim 1, wherein said determining circuit has monitor means for outputting a periodic signal corresponding to the driving state of said motor and a phase detecting circuit for detecting the phase difference between the periodic signal from said monitor means and said periodic voltage and producing an output when said phase difference becomes a predetermined phase difference, and said inhibiting means is responsive to the output of said phase detecting circuit to inhibit the change of the frequency by said changing circuit.

5. A control device according to claim 4, wherein said monitor means is an electrostrictive element disposed on the surface of said vibration member.

6. A control device according to claim 4, wherein said monitor means is a piezoelectric element disposed on the surface of said vibration member.

7. A control device according to claim 1, wherein said electro-mechanical energy conversion element is an electrostrictive element.

8. A control device according to claim 1, wherein said electro-mechanical energy conversion element is a piezoelectric element.

9. A control device for a vibration wave motor in which a periodic voltage is applied to an electro-mechanical energy conversion element disposed on a vibration member to form a travelling vibration wave in the vibration member and a contact member is driven by said travelling vibration wave, said control device comprising:
   (a) a detecting circuit for detecting a driving state of the motor and producing an output when the motor becomes a resonance driving state or the vicinity of the resonance driving state;
   (b) a changing circuit for time-serially changing a frequency of the periodic voltage in succession, said changing circuit changing the frequency independently from the detecting operation of said detecting circuit for detecting the resonance or the vicinity of the resonance driving state, said changing circuit changing the frequency from a predetermined value toward a frequency of the resonance driving state, said state in the vicinity of the resonance driving state being a state where the frequency is shifted from the frequency of the resonance driving state toward the predetermined value; and
   (c) an inhibiting circuit responsive to the output of said detecting circuit to inhibit substantial renewal of the frequency controlled by said changing circuit.

10. A control device according to claim 9, wherein said changing circuit changes the frequency by each predetermined value and said inhibiting circuit is alternately effect said changing operation of the predetermined value by said changing circuit and a changing operation of said predetermined value in the direction opposite to the direction of change by said changing operation.

11. A control device according to claim 9, wherein said detecting circuit has monitor means for outputting a periodic signal corresponding to the driving state of the motor, and a phase detecting circuit for detecting the phase difference between the periodic signal from said monitor means and said periodic voltage and producing an output when said phase difference becomes a predetermined phase difference.

12. A control device according to claim 11, wherein said monitor means is an electrostrictive element disposed on the surface of said vibration member.

13. A control device according to claim 11, wherein said monitor means is a piezoelectric element disposed on the surface of said vibration member.

14. A control device according to claim 9, wherein said electro-mechanical energy conversion element is an electrostrictive element.

15. A control device according to claim 9, wherein said electro-mechanical energy conversion element is a piezoelectric element.

16. A control device for a vibration wave motor in which a periodic voltage is applied to an electro-mechanical energy conversion element disposed on a vibration member to form a travelling vibration wave in the vibration member and a control member is driven by said travelling vibration wave, said control device having:
    (a) a changing circuit for changing the frequency of said periodic voltage;
    (b) drive detecting means for detecting whether said motor is being driven;
    (c) frequency detecting means for detecting the maximum of the frequency changed by said changing circuit in a state in which the driving of said motor is detected by said drive detecting means or a frequency in the vicinity of the maximum; and
    (d) a control circuit for setting the frequency at the starting of said motor for the next driving thereof to a frequency corresponding to the frequency detected by said frequency detecting means during the preceding driving of the motor, and causing the frequency changing operation by said changing circuit to be performed from said frequency.

17. A control device according to claim 16, wherein; in case of the first driving of the motor, said changing circuit successively decreases the frequency from a particular value, and said control circuit sets the frequency which is detected by said drive detecting means at the time when said drive detecting means detect the start of rotating of the motor under the decrease in said frequency as the next starting frequency detected by said frequency detecting means.

18. A control device for a vibration wave motor in which a periodic voltage is applied to an electro-mechanical energy conversion element disposed on a vibration member to form a travelling vibration wave in the vibration member and a contact member is driven by said travelling vibration wave, said control device comprising:
    (a) a changing circuit for changing the frequency of said periodic voltage in succession from a particular initial value for driving the motor;
    (b) detecting means for detecting the start of the driving of said motor; and
    (c) a setting circuit for setting the frequency changed by said changing circuit when the start of the driving of said motor is detected by said detecting means as an initial value for the frequency change by said changing circuit during the next driving of the motor.

19. A control device according to claim 18, wherein said changing circuit changes the frequency in succession from the initial value to the direction of decreasing for driving the motor.

20. A control device according to claim 19, further comprising comparing means for comparing the initial value set by said setting circuit with the frequency changed by said changing circuit during the driving of the motor after the motor is started, and causing said setting circuit to set the frequency changed by said changing circuit as a new initial value when the frequency changed by said changing circuit has become a frequency higher than said initial value.

21. A control device for a vibration wave motor in which a periodic voltage is applied to an electromechanical energy conversion element disposed on a vibration member to form a travelling vibration wave in the vibration member and a control member is driven by said travelling vibration wave, said control device comprising:
    (a) a changing circuit for changing the frequency of said periodic voltage; and
    (b) a setting circuit for setting the maximum frequency changed by said changing circuit during the driving of the motor or a frequency in the vicinity of said maximum frequency as the initial value of the frequency changed by said changing circuit at the next starting of the motor.

22. A control device according to claim 16, wherein said electro-mechanical energy conversion element is an electrostrictive element.

23. A control device according to claim 16, wherein said electro-mechanical energy conversion element is a piezoelectric element.

24. A control device according to claim 18, wherein said electro-mechanical energy conversion element is an electrostrictive element.

25. A control device according to claim 18, wherein said electro-mechanical energy conversion element is a piezoelectric element.

26. A control device according to claim 21, wherein said electro-mechanical energy conversion element is an electrostrictive element.

27. A control device according to claim 21, wherein said electro-mechanical energy conversion element is a piezoelectric element.

28. A device having a vibration motor in which a periodic signal is applied to an electromechanical energy conversion element to form a vibration as a driving force, comprising:
    (a) a determining circuit for monitoring a driving state of said motor and determining a resonance frequency or a frequency in the vicinity thereof;
    (b) a changing circuit for changing a frequency of the periodic signal from a predetermined value toward the resonance frequency, said changing circuit changing the frequency independently from the resonance frequency or the frequency in the vicinity thereof determined by said determining circuit; and
    (c) inhibiting means for inhibiting the frequency changed by said changing circuit from shifting to a frequency exceeding the resonance frequency or the frequency in the vicinity thereof, said frequency in the vicinity thereof being a frequency shifted from the resonance frequency toward the predetermined value.

29. A device having a vibration motor in which a periodic signal is applied to an electromechanical energy conversion element to form a vibration as a driving force, comprising:
(a) a detecting circuit for detecting a driving state of the motor and producing an output when the motor becomes a resonance driving state or the vicinity of the resonance driving state;
(b) a changing circuit for time-serially changing a frequency of the periodic signal in succession, said changing circuit changing the frequency independently from the detecting operation of said detecting circuit for detecting the resonance or the vicinity of the resonance driving state, said changing circuit changing the frequency from a predetermined value toward a frequency of the resonance driving state, the state in the vicinity of the resonance driving state being a state where the frequency is shifted from the frequency of the resonance driving state toward the predetermined value; and
(c) an inhibiting circuit responsive to the output of said detecting circuit to inhibit substantial renewal of the frequency controlled by said changing circuit.

30. A device having a vibration motor in which a periodic signal is applied to an electromechanical energy conversion element to form a vibration as a driving force, comprising:
(a) a changing circuit for changing the frequency of the periodic signal;
(b) drive detecting means for detecting whether said motor is being driven;
(c) frequency detecting means for detecting the maximum of the frequency changed by said changing circuit in a state in which the driving of said motor is detected by said drive detecting means or a frequency in the vicinity of the maximum; and
(d) a control circuit for setting the frequency at the starting of said motor for the next driving thereof to a frequency corresponding to the frequency detected by said frequency detecting means during the preceding driving of the motor, and causing the frequency changing operation by said changing circuit to be performed from said frequency.

31. A device having a vibration motor in which a periodic signal is applied to an electromechanical energy conversion element to form a vibration as a driving force, comprising:
(a) a changing circuit for changing the frequency of the periodic signal in succession from a particular initial value for a driving the motor;
(b) detecting means for detecting the start of the driving of said motor; and
(c) a setting circuit for setting the frequency as an initial value for frequency change by said changing circuit during the next driving of the motor, the initial value for the frequency set by said setting circuit being a value corresponding to a frequency at a time said detecting means detects the start of operation of the motor in a previous operation of the motor.

32. A vibration motor in which a periodic signal is applied to an electromechanical energy conversion element to form a vibration as a driving force, comprising:
(a) a changing circuit for changing the frequency of the periodic signal; and
(b) a setting circuit for setting the maximum frequency changed by said changing circuit during the driving of the motor or a frequency in the vicinity of said maximum frequency as an initial value of the frequency changed by said changing circuit at the next starting of the motor.

33. A device according to claim 28, wherein said changing circuit time-serially changes the frequency of the periodic signal from a frequency higher than the resonance frequency to a frequency lower than the resonance frequency.

34. A device according to claim 33, wherein said changing circuit has renewing means for time-serially renewing the determined frequency value by a predetermined value each toward the lower frequency.

35. A device according to claim 28, wherein said determining circuit has monitor means for outputting a periodic monitoring signal corresponding to the driving state of said motor and a phase detecting circuit for detecting the phase difference between the periodic monitoring signal from said monitor means and the periodic signal and for producing an output when said phase difference becomes a predetermined phase difference, and said inhibiting means is responsive to the output of said phase detecting circuit to inhibit the change of the frequency by said changing circuit.

36. A device according to claim 29, wherein said changing circuit changes the frequency of the periodic signal by each predetermined value and said inhibiting circuit is responsive to the output of said detecting circuit to alternately effect said changing operation of the predetermined value of said changing circuit and a changing operation of said predetermined value in the direction opposite to the direction of change by said changing operation.

37. A device according to claim 29, wherein said detecting circuit has monitor means for outputting a periodic monitoring signal corresponding to the driving state of the motor, and a phase detecting circuit for detecting the phase difference between the periodic monitoring signal from said monitor means and the periodic signal and producing an output when said phase difference becomes a predetermined phase difference.

* * * * *

UNITED STATES PATENT AND TRADEMARK OFFICE
CERTIFICATE OF CORRECTION

PATENT NO. : 5,159,253

DATED : October 27, 1992

INVENTOR(S) : Shimizu et al.

It is certified that error appears in the above-identified patent and that said Letters Patent is hereby corrected as shown below:

COLUMN 3

Line 57, "phase locked" should read --phase-locked--.

COLUMN 4

Line 40, "formed" should read --is formed--.

COLUMN 9

Line 6, "F>MAX," should read --F>FMAX,--.

COLUMN 11

Line 3, "dirven" should read --driven--.
    Line 44, "device," --device--.

COLUMN 12

Line 58, "is alter-" should read --is responsive to the output of said detecting circuit to alter- --.

UNITED STATES PATENT AND TRADEMARK OFFICE
CERTIFICATE OF CORRECTION

PATENT NO. : 5,159,253

DATED : October 27, 1992

INVENTOR(S) : Shimizu et al.

It is certified that error appears in the above-identified patent and that said Letters Patent is hereby corrected as shown below:

COLUMN 13

Line 20, "control member" should read --contact member--; and
    Line 45, "detect" should read --detects--.

COLUMN 14

Line 16, "control member" should read --contact member--.

Signed and Sealed this

Twenty-third Day of November, 1993

Attest:

BRUCE LEHMAN

*Attesting Officer*     *Commissioner of Patents and Trademarks*